(12) United States Patent  
Hartman et al.

(10) Patent No.: US 8,397,181 B2
(45) Date of Patent: Mar. 12, 2013

(54) METHOD AND APPARATUS FOR MARKING A POSITION OF A REAL WORLD OBJECT IN A SEE-THROUGH DISPLAY

(75) Inventors: Randolph G. Hartman, Plymouth, MN (US); Duke Buster, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 1007 days.

(21) Appl. No.: 12/272,395

(22) Filed: Nov. 17, 2008

(65) Prior Publication Data

US 2010/0125812 A1 May 20, 2010

(51) Int. Cl.
  *G06F 3/048* (2006.01)
(52) U.S. Cl. ............ 715/848; 345/156; 345/8; 345/419; 348/239
(58) Field of Classification Search .................. 345/156, 345/8, 419; 348/239
  See application file for complete search history.

(56) References Cited

U.S. PATENT DOCUMENTS

| 7,369,101 | B2 * | 5/2008 | Sauer et al. ........................ 345/8 |
| 7,414,617 | B2 | 8/2008 | Ogawa |
| 2002/0113756 | A1 * | 8/2002 | Tuceryan et al. .................. 345/8 |
| 2004/0051711 | A1 * | 3/2004 | Dimsdale et al. ............. 345/419 |
| 2004/0131232 | A1 | 7/2004 | Meisner et al. |
| 2004/0183926 | A1 * | 9/2004 | Fukuda et al. ................. 348/239 |
| 2005/0088424 | A1 | 4/2005 | Morrison et al. |
| 2007/0242886 | A1 | 10/2007 | St. John |
| 2008/0030461 | A1 * | 2/2008 | Matsui et al. .................. 345/156 |
| 2008/0266323 | A1 | 10/2008 | Biocca et al. |

FOREIGN PATENT DOCUMENTS

| EP | 1720131 | 11/2006 |
| GB | 2377147 | 12/2002 |

OTHER PUBLICATIONS

UK Intellectual Property Office, "Great Britain Search Report", Jan. 27, 2010, Published in: GB.

* cited by examiner

*Primary Examiner* — Matt Kim
*Assistant Examiner* — Tuan S Nguyen
(74) *Attorney, Agent, or Firm* — Fogg & Powers LLC

(57) ABSTRACT

A method for marking a position of a real world object on a see-through display is provided. The method includes capturing an image of a real world object with an imaging device. A viewing angle and a distance to the object are determined. A real world position of the object is calculated based on the viewing angle to the object and the distance to the object. A location on the see-through display that corresponds to the real world position of the object is determined. A mark is then displayed on the see-through display at the location that corresponds to the real world object.

27 Claims, 6 Drawing Sheets

METHOD AND APPARATUS FOR MARKING A POSITION OF A REAL WORLD OBJECT IN A SEE-THROUGH DISPLAY

BACKGROUND

The combination of virtual images or videos with the images or videos captures of the real world is generally referred to as augmented reality vision. Augmented reality vision systems are beginning to have use in a variety of situations.

For example, one use of augmented reality is in a see-through display where a user observes the real world directly and has additional information overlaid on the observation with the see-through display. Augmented reality may also be used to supplement video of the real world, such as a live video broadcast. Here, the original video captures the real world directly and the graphics or other information is overlaid on the real world video. Many television news casts today are examples of a real world video overlaid with additional virtual information. As augmented reality systems become more prevalent additional functionality will be desired.

SUMMARY

The following summary is made by way of example and not by way of limitation. In one embodiment, a method for marking a position of a real world object on a see-through display is provided. The method includes capturing an image of a real world object with an imaging device. A viewing angle and a distance to the object are determined. A real world position of the object is calculated based on the viewing angle to the object and the distance to the object. A location on the see-through display that corresponds to the real world position of the object is determined. A mark is then displayed on the see-through display at the location that corresponds to the real world object.

DRAWINGS

DETAILED DESCRIPTION

Figure 1:
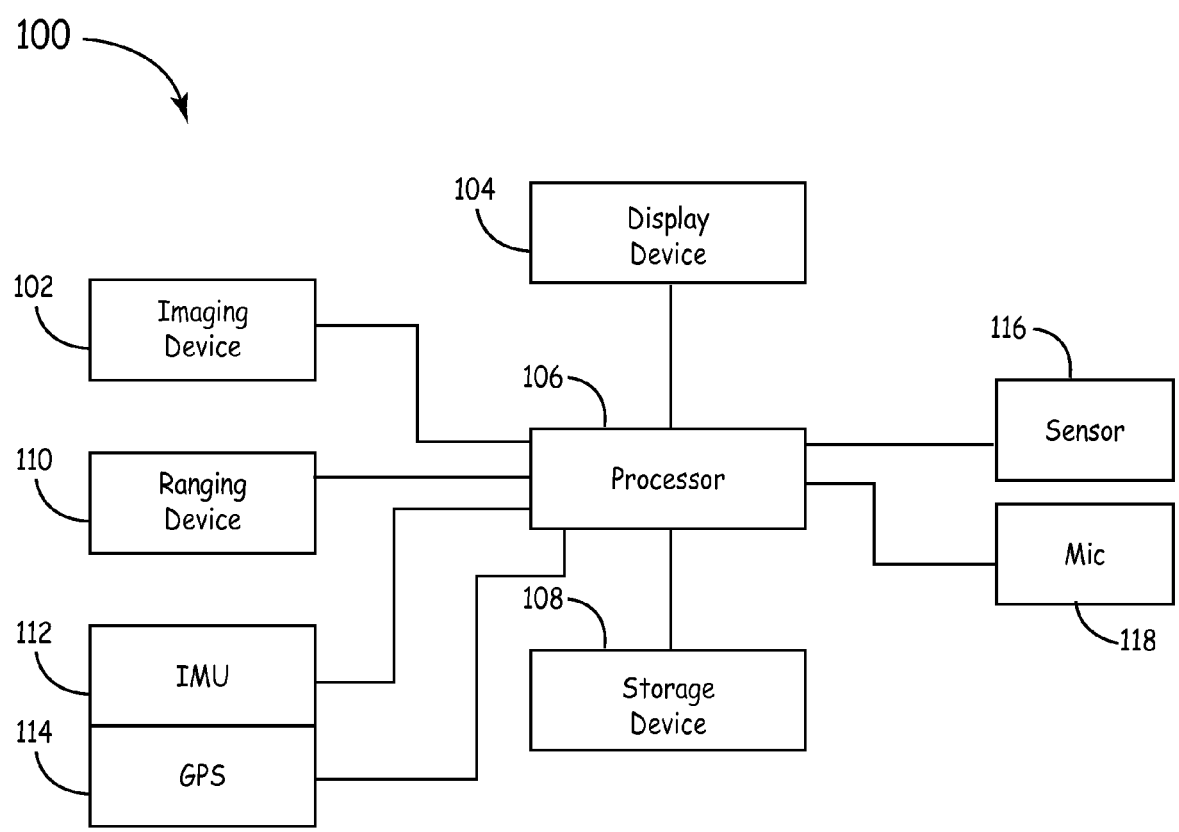
FIG. 1 is a block diagram of one embodiment of a system for marking in a display based on a pointing object in the real world.

FIG. 1 is one embodiment of a system 100 for selecting and maintaining a position of the mark on a display relative to a real world scene. System 100 includes an imaging device 102, a display device 104, at least one processor 106, and a storage medium 108. Imaging device 102, display device 104, and storage medium 108 are communicatively coupled to the at least one processor 106. Examples of suitable imaging devices 102 include, but are not limited to an EO camera, IR camera, LIDAR, RADAR, or SONAR device. In this embodiment, imaging device 102 is a video camera that captures video in a frame-by-frame manner. System 100 also includes a ranging device 110, an inertial measurement unit (IMU) 112, and a global positioning system receiver (GPS) 114. Inertial measurement unit 112 and global position system 114 are mounted together with imaging device 102 and are used to determine the orientation and position of imaging device 102. Ranging device 110 is also mounted together with imaging device 102 and is configured to determine a distance from ranging device 110 to objects/surfaces in the real world. In one embodiment, imaging device 102 and ranging device 110 are both implemented with a single Light Intensity and Ranging Device (LIDAR). Finally, system 100 includes a sensor 116 for recognizing actions by a user and a microphone 118 for capturing commands from a user.

Figure 2:
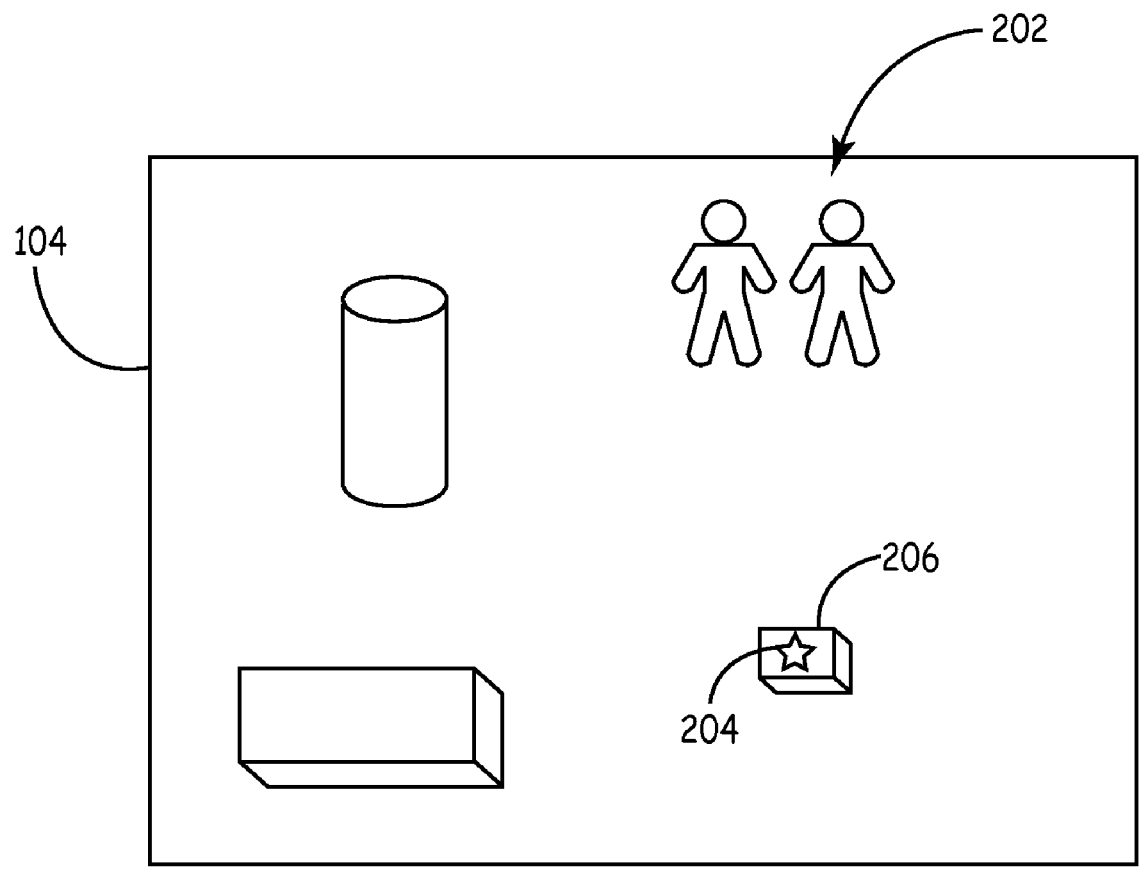
FIG. 2 is view of a display device augmenting a background with an icon.

FIG. 2 illustrates one embodiment of display device 104 and a real world background 202. In one embodiment, display device 104 is a see-through display (referred to herein as see-through display 104) where a user views background 202 directly through see-through display 104 and the view of the user is augmented by see-through display 104.

As shown in FIG. 2, see-through display 104 is displaying a mark 204. Mark 204 is a virtual representation of a point in space in the real world. In particular, mark 204 represents a point on the object or surface "behind" mark 204 in background 202. System 100 maintains the location of mark 204 relative to background 202 on see-through display 104. As shown in FIG. 2, mark 204 is locked to a cube 206 within background 202. Thus, as the user moves or rotates, mark 204 remains locked to cube 206 as if mark 204 were a part of background 202 and located at the location of cube 206. Although in the embodiment shown in FIG. 2, mark 204 has a certain shape and size as shown, in other embodiments, other marks are made on display device 104, including, but not limited to text, lines, dots, or other graphics.

Imaging device 102 is positioned such the imaging view overlaps at least partially with the view of the user when the user is looking through see-through display 104. Furthermore, in this embodiment imaging device 102 and the field of view of imaging device 102 is locked relative to the field of view of the user such that they are the same local view. Similarly, ranging device 110 is oriented such that ranging device 110 determines a distance from the user to an object or surface within the field of view of the user when viewing through see-through display 104.

Figure 3:
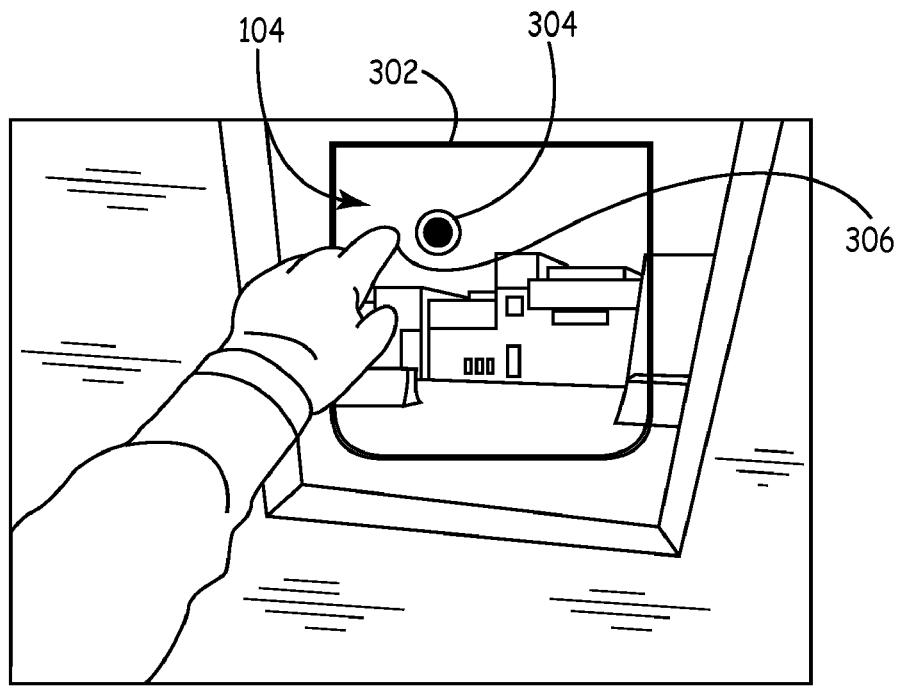
FIG. 3 is an illustration of a field of view of a user illustrating a background scene with an icon on a see-through display.

FIG. 3 illustrates one embodiment of a mark that is created based on a pointing object 306 within the field of view of the user when looking through see-through display 104. In FIG. 3 a field of view of a user is shown where pointing finger 306 of the user is translated into a mark on see-through display 104. Box 302 illustrates the area of the field of view of the user that is viewed through see-through display 104. As shown, see-through display 104 has overlaid an icon 304 into the view of the user. System 100 recognizes pointing finger 306 of the user within the field of see-through display 104 by capturing frames of finger 306 with imaging device 102. System 100 places icon 304 at the location in which pointing finger 306 is directed. In this way, system 100 translates pointing finger 306 into a mark (icon 304) on see-through display 104. System 100 then determines the real world location of icon 304 as described below and stores the real world location in storage device 108 for reference later or for other processing. Additionally, as describe below with respect to method 600, the mark is maintained in the same location on see-through display 104 by monitoring the changes in the orientation of the see-through display and the location of the see-through display using various combinations of the IMU 112, GPS 114, and imaging device 102.

Figure 4:
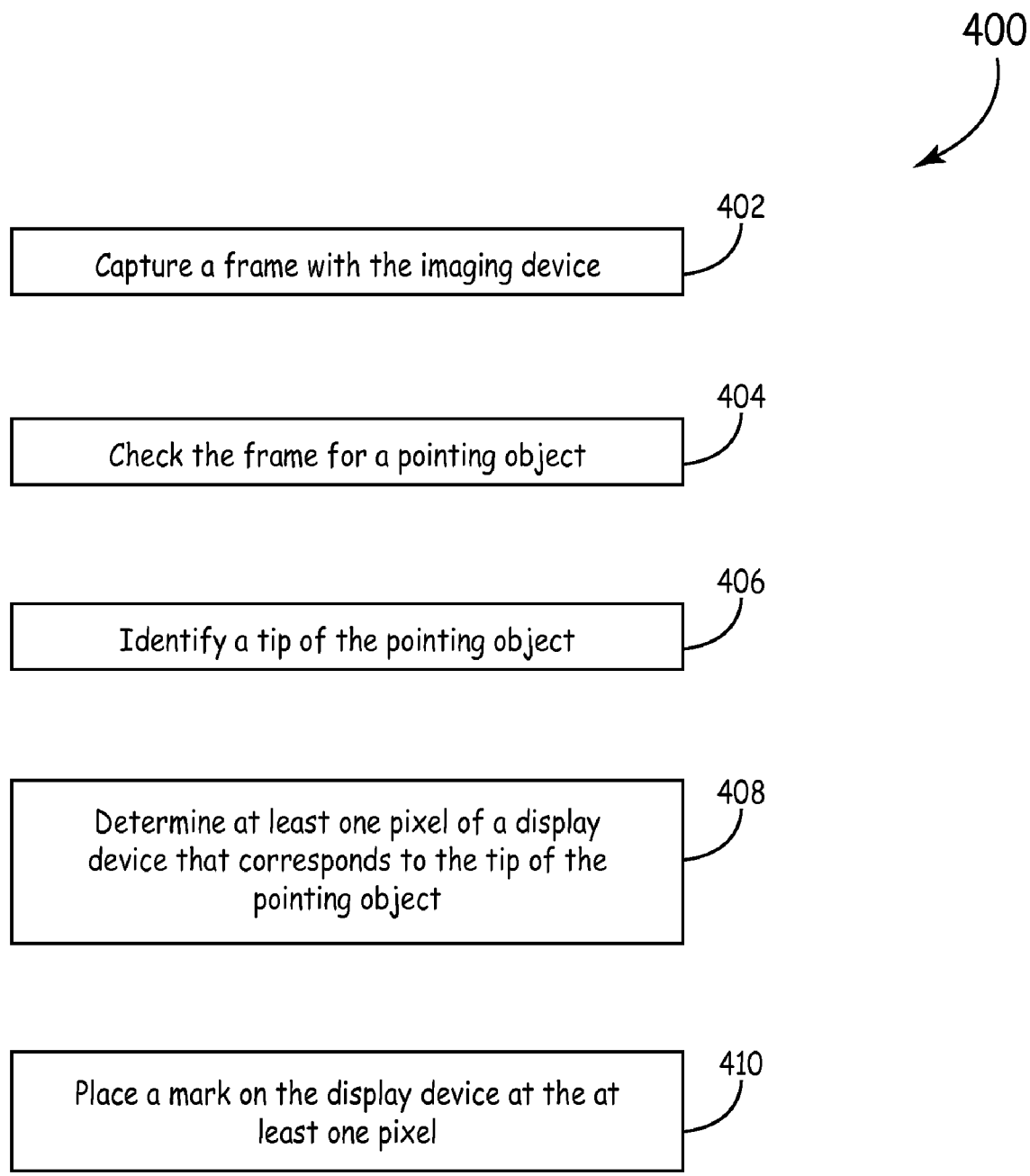
FIG. 4 is a flow chart illustrating one embodiment of a method for marking in a display based on a pointing object in the real world.
Figure 6:
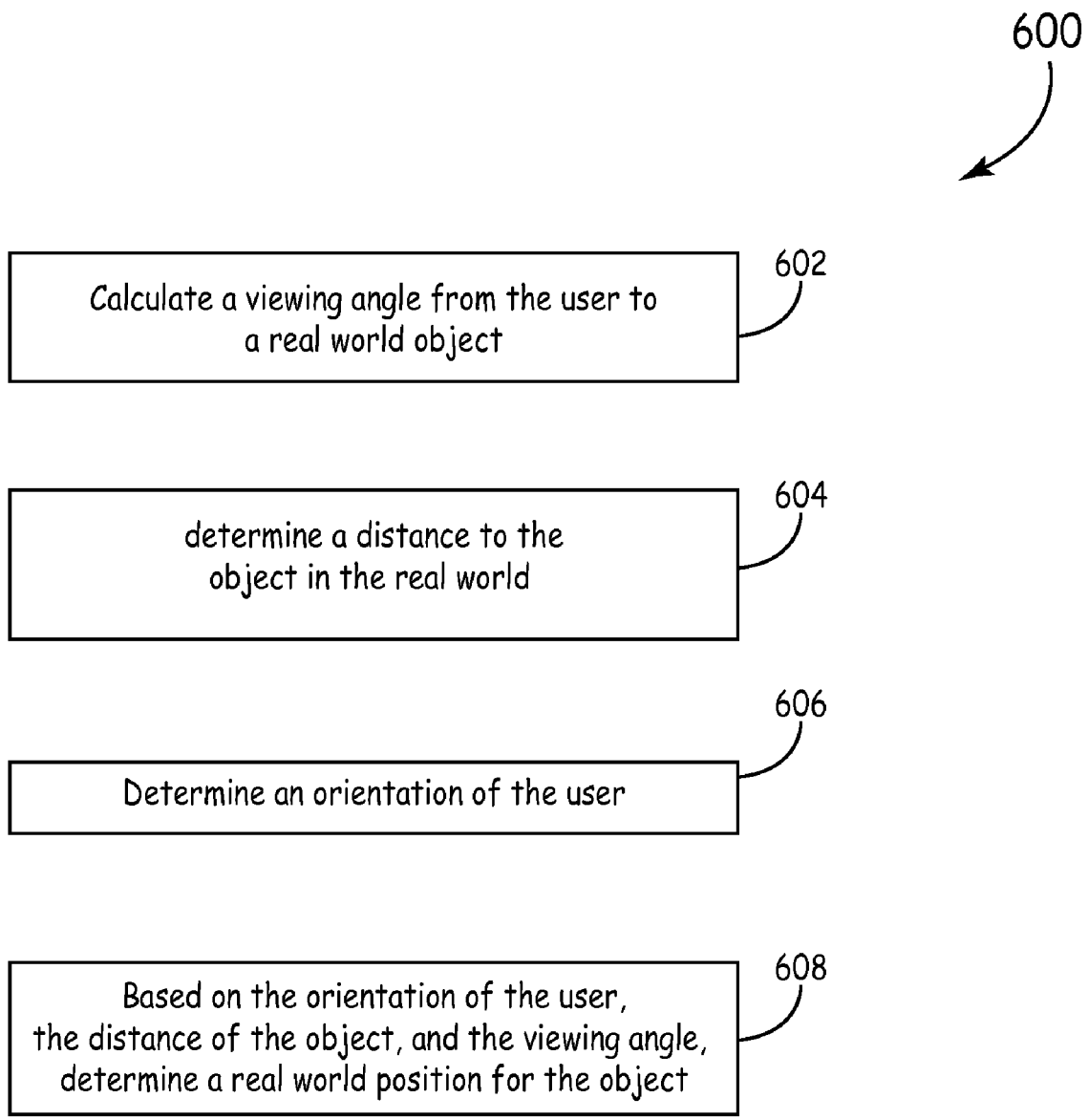
FIG. 6 is a flow chart illustrating one embodiment of a method for maintaining a position of a mark on a see-through display relative to the real world.

FIG. 4 is a flow chart illustrating one embodiment of a method 400 for marking on a see-through display based on a pointing object. At block 402 of method 400, imaging device 102 captures a frame of the field of view of imaging device 102. The frame(s) captured by imaging device 102 is sent to processor 106. In embodiments where imaging device 102 is a video camera, imaging device 102 is continually recording frames that are being sent to and analyzed by processor 106. At block 404, processor 106 checks the frames for a pointing object within the frame. In one embodiment, processor 106 performs feature recognition on the frames from imaging device 102 to identify pointing objects within the frame. At block 406, once a pointing object has been identified within a frame, processor 106 determines a tip of the pointing object. For example, if a hand with a pointing finger is the pointing object, processor 106 identifies the end of the finger as the point. At block 408, once the tip of the pointing object has been identified, system 100 identifies the location of see-through display 104 that corresponds to the tip of the pointing object. Then at block 410, a mark is placed at the location of see-through display 104 that were determined as corresponding to the point of the pointing device. More detail regarding the steps of method 400 is provided below.

Although the embodiments described below are described in terms of a hand with a pointing finger as the pointing object, in other embodiments, other items may be used as the pointing object. For example, in one embodiment, an elongated pointing stick is used as the pointing object. In another embodiment, a pencil is used as the pointing object.

At block 404, processor 106 determines whether there is a pointing object within the frame(s) received from imaging device 102. As mentioned above, in one embodiment, feature recognition algorithms are used to identify pointing objects within the frames. For example, in one embodiment, processor 106 is programmed to use feature recognition to search frames from imaging device 102 for a hand with a pointing finger. Here, the feature recognition algorithm would recognize a hand shape and/or an arm with a hand and finger extended at the end of the arm. Conventional feature recognition algorithms can be used to identify the pointing object within the frames as known to those skilled in the art. In other embodiments, other features could be recognized by the feature recognition algorithm. Additionally, in one embodiment, the feature recognition algorithm checks for pointing objects extending from a certain area of the frame. Here feature recognition takes into account the location of imaging device 102 relative to the probable entrance region of the pointing object into the field of view of imaging device 102. For example, in the embodiment shown in FIG. 7, imaging device 102 is mounted on goggles on a head of a user and is configured to recognize a pointing gesture of the user's hand as a pointing object. In this situation, the feature recognition system of processor 106 could be configured to recognize a hand and/or arm entering the bottom of frame. Using expected areas of pointing objects may aid in reducing false identification of pointing objects.

In one embodiment, system 100 searches for a pointing object when a command is provided to system 100. For example, a user may press a button connected to system 100 to activate system 100 searching for a pointing object. In other embodiments, other methods may be used to provide the command, including, but not limited to verbal commands provided to microphone 210 or programmed routines based on software operating on system 100. When the command is received by system 100, imaging device 102 turns on (if not already on) and captures a frame from its field of view. The frame is sent to processor 106 which after receiving the activation command searches the received frames for a pointing object.

In one embodiment, the command received by system 100 is from sensor 116 whish is mounted on the arm of the user. Sensor 116 on the arm of the user senses motion of the arm. When the arm is raised sensor 116 sends a signal to processor 102. Processor 106 uses this signal to begin the process of checking frames for the pointing finger within the frames received from imaging device 102. Thus, system 100 searches for the user's hand as a pointing object when the user's arm is raised. In another embodiment, sensor 116 is more precise and senses the relative position of the arm and sends a signal to processor 106 when the arm reaches the specific area of field of view of imaging device 102. In other embodiments, sensor 116 senses other movements for system 100.

Once processor 106 identifies a pointing object within a frame, processor 106 determines a tip of the pointing object. For example, in this embodiment, the user's hand enters the field of view of imaging device 102 from the bottom. Thus, the tip of a pointed finger is identified by searching for the top of the finger in the frame. Processor 106 would therefore determine that the top of the finger is the tip of the finger. In other embodiments, other methods of determining the point of pointing device may be used including feature recognition algorithms.

Once the tip of the pointing device has been identified, processor 106 determines the location on the display of see-through display 104 that correspond to the tip of the pointing device. To determine this, processor 106 is provided with the relationship between the field of view of imaging device 102 and the display on see-through display 104. Imaging device 102 and see-through display 104 are coordinated such that the field of view of imaging device 102 (or a portion of the field of view) is correlated with the display on see-through display 104 (or a portion of the display on see-through display 104). The field of view of imaging device 102 is correlated with see-through display 104 by setting up a relationship between the field of view of imaging device 102 and the location of see-through display 104. In other words, the location of objects within the field of view of imaging device 102 is correlated with the location of display device 104. For example, the upper left portion of the field of view of imaging device 102 may be correlated with the upper left of see-through display 104. Likewise, the lower left portion of the field of view of imaging device 102 is correlated with the lower left of see-through display 104. The other portions of the field of view of imaging device 102 are correlated with the counterpart portions of the display of display device. In this way, a pointing object action occurring in the upper left portion of the field of view of imaging device 102 is translated to a mark in the upper left of see-through display 104.

In one embodiment, the field of view of imaging device 102 and see-through display 104 are correlated during manufacture of system 100. For example, imaging device 102 and display device 104 are mounted in a fixed relationship. Imaging device 102 then captures a frame. The image is compared to the field of view of a user through the see-through display and a chart is made mapping the pixels of the frame from imaging device 102 to locations on see-through display 104. This chart is then used to translate the pixel of the image of imaging device 102 to the location on see-through display 104. If desired the orientation of imaging device 102 or see-through display 104 is modified to achieve a desired overlap between the devices. The goal here is to have the location at which the user (when looking through the see-through display) views the tip of the pointing object be as close as possible to the location selected by processor 106.

Once the correlation has been made between imaging device 102, see-through display 104 outputs a mark at the determined location. The mark made on see-through display 104 can be any type of mark used on display devices including, but not limited to, a freeflow line that follows the pointing object as the pointing object moves, an icon, or a shape.

Figure 5:
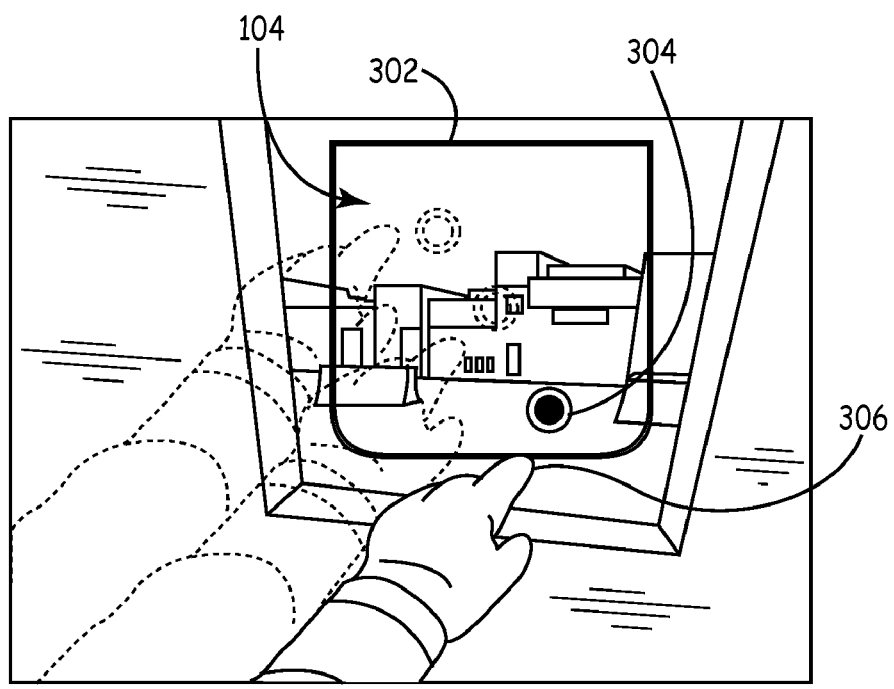
FIG. 5 is an illustration of a field of view of the user from FIG. 3 illustrating the location of a mark being adjusted based on a pointing finger.

In one embodiment, an initial mark is placed at the location of see-through display 104 that corresponds with the tip of the pointing object, but the mark is not immediately locked to the real world location behind see-through display 104. The mark can be adjusted and moves coherently as the pointing object moves relative to the field of view of imaging device 102 and see-through display 104. In this way the user can fine tune the location of the icon in see-through display 104. FIG. 5 illustrates a view through see-through display 104 showing the movement of icon 304 within the see-through display. As shown in FIG. 5, icon 304 moves on the display as the user moves his arm and his pointing finger 306. To follow the tip of the pointing object across the display of see-through display 104, processor 106 continually analyzes frames from imaging device 102 to determine the location of the tip of the pointing object and place the icon at the updated (if moved) position of the tip of the pointing object. The icon follows the pointing object until a command is given by the user to lock in the position of the pointing object. In one embodiment, the command from the user received by system 100 is a verbal command received from microphone 118. In other embodiments, however, other methods are used to provide the command to system 100 including, but not limited to, a button press, a mouse click, and a sequence of keyboard keys.

In another embodiment, the mark is a freeflow line that is starts drawing on a command and continues to draw as the pointing object moves through the field of view of imaging device 102. The freeflow line is stopped on a command. Commands to start and stop the freeflow line include a button on system 100, a verbal command received through microphone 118, and others.

Moving the icon with the point device, but not locking in until a command is given is advantageous because it enables the user to adjust the location of the mark positioned by system 100. It may be difficult for the user to achieve the exact desired position on the display of see-through display 104 on the first try. Thus, this enables the user to adjust the location where the mark will be placed or where a freeflow line will begin based on the initial placement of the mark by system 100.

To draw a continuous freeflow line or to drag (adjust) the icon as the pointing object moves across the screen, processor 106 updates the determination of what location on see-through display 104 corresponds to the tip of pointing device as new frames are received from imaging device 102. For example, after a mark is placed on the display based on a first frame, a second frame is received by processor 106 and a pointing device and the tip thereof are identified in the new frame. The location of the tip of the pointing device is then correlated with a location of the display. It is then determined whether the tip of the pointing device in the second frame is correlated with a different location than the first frame. The updated location is then used for the new drawing marks or the new location of the icon.

In one embodiment, a mark identified by one user using a pointing method is communicated to be identified to a second user. The processor of the second user finds the same cube within the field of view of the second user's imaging device based on the location information obtained from the first user. Thus, the cube can be identified to the second user.

In order to maintain mark 204 in the same position relative to background 202, system 100 determines a real world position for the object and calculates the location of mark 204 on display device 104 based on that position. The real world position of an object refers to the location of the object in the real world. The location may be relative to another real world object (such as the user) or in terms of a global positioning system.

FIG. 3 illustrates one embodiment of a method 600 of marking a position of a real world object on a see-through display. A mark 204 may be created or positioned on see-through display 104 in many ways as known to those skilled in the art. For example, in one embodiment mark 204 is created based on system 100 recognizing a pointing object and creating mark 204 at a tip of the pointing object as described above. In another embodiment, mark 204 is created through a command provided to system 100 which causes system 100 to create mark 204 in a generic location on see-through display 104. Mark 204 is then commanded to move across the display of see-through display 104 to the desired location. The commands to create and move mark 204 can be any command as known to those skilled in the art including, push button, toggle stick, voice commands, or other commands. In yet another embodiment, mark 204 is created and adjusted by a mouse click or the like.

Mark 204 is placed at the location within see-through display 104 at which the user desired to lock mark 204 relative to the real world. For example, in FIG. 2, mark 204 is placed to overlay cube 206, since the user desires to mark cube 206 with mark 204.

At block 602, a viewing angle is determined for the object on which mark 204 is overlaid (cube 206 in this embodiment). The viewing angle is determined based on the location of the object within the field of view of imaging device 102. If the object is located in the center of the field of view of imaging device 102, the viewing angle to cube 206 would be zero degrees elevation and zero degrees azimuth. If the object is located near the bottom right of the field of the view of imaging device 102, the viewing angle may be −25 degrees elevation and 30 degrees to the azimuth, for example.

At block 604, a distance to cube 206 is determined based on the viewing angle. In one embodiment, the distance is determined with ranging device 110. Ranging device 110 is aimed at the viewing angle such that ranging device 110 determines the distance from the perspective of the user to cube 206. For example, as shown in FIG. 2, ranging device determines the distance from the perspective of the user to cube 206. In one embodiment, processor 106 determines the angle for ranging device 110 by determining the azimuth and elevation of the vector. In one embodiment, ranging device 110 is a laser that determines the amount of time it takes a laser beam to travel from the laser to an object and back.

In one embodiment, the viewing angle is determined based on an imaginary vector starting at the user, traveling through a representative location for mark 204 and ending at cube 206. Thus, the vector "points" through mark 204. The vector is used to determine the angle at which the location is located with respect to the orientation of the user. From the viewing angle, ranging device 110 determines a distance from the user to the object or surface of background 202 upon which mark 204 is overlaid (cube 206 in this embodiment). Thus, in the embodiment shown in FIG. 2, the vector would travel from the perspective of user through the center of mark 204 and end at cube 206. In another embodiment, the viewing angle is determined along a line from the user to a tip of the pointing device to the object.

Processor 106 calculates the vector based on a known relationship between the perspective of the user and the location within the display of see-through display 104. For example, a vector traveling through a location on the lower half of the display of see-through display 104 would have a downward angle relative to the center of the field of view of the user. The relationship (and resulting vectors) for the locations relative to the center of the field of view of the user is determined during an initialization of system 100. The vector is then used as the viewing angle at which mark 204 is located.

At block 606, once the distance to cube 206 is known, the orientation of the perspective of the user is determined. The orientation of the perspective of the user is determined by IMU 112 and a current location of the perspective of the user is determined via GPS 114. IMU 112 provides additional information to processor 106 regarding the rotation and acceleration of the user. GPS 114 provides information to processor 106 regarding the global reference position of the perspective of user. Processor 106 uses the information from GPS 114 and IMU 112 to determine an orientation of the user. In one embodiment, the orientation is expressed as a pitch roll and heading for the user. Methods to combine information from a GPS and an IMU to determine an orientation are known to those skilled in the art and are not described herein. In other embodiments, the orientation of is determined by using imaging device 102 to determine the orientation based on features within captures images and GPS 114 to determine the location of the imaging device 102.

At block 608, once the orientation of the user is known, a real world position of cube 206 is determined. The real world position of an object refers to the location of the object in the real world. In one embodiment, the real world position of cube 206 is determined relative to the user. Processor 106 uses the orientation information obtained from IMU 112 and GPS 114 along with the distance to the cube 206 from the perspective of user obtained by ranging device 110 to determine the geo-position of cube 206. For example, if cube 206 is determined to be 200 ft. from the user and the user is oriented in a north-westerly direction, then the real world position of cube 206 is 200 ft. north-west of the user. As known to those skilled in the art, in other embodiments, other units and positional terms are used to describe the location of cube 206 relative to the user.

In one embodiment, the real world position of cube 206 is determined with a global reference system. For example, the latitudinal and longitudinal coordinates of cube 206 are determined. The latitudinal and longitudinal coordinates of cube 206 are determined based on the latitudinal and longitudinal coordinates of the user and the distance and bearing of cube 206 relative to the user. The latitudinal and longitudinal coordinates of the user are obtained from GPS 114. The coordinates of cube 206 are then calculated based on the coordinates of the user and the distance from the user to cube 206 along with the direction in which cube 206 is located relative to the user as determined above. In other embodiments the coordinates are calculated with respect to a local reference frame.

In either case, once the real world position of cube 206 is determined, system 100 continually determines the position of mark 204 within see-through display 104 such that mark 204 appears to the user in see-through display 104 as being located in its real world position. Thus, system 100 adjusts the position of mark 204 to account for movement of the perspective of user. To determine where to position mark 204 within the display of see-through display 104, system 100 tracks the movement of the user. In the embodiment described above where the real world position of mark 204 is identified by a relationship to the user, the movements of the user are used to update the relationship between the user and cube 206. For example, if cube 206 is 600 ft. north-west of the user, and the user moves 100 ft. to the west, the relative real world position of mark 204 would be updated to be 200 ft. to the north of the perspective of user. According to the updated relative position of cube 206, the location of mark 204 within see-through display 104 would be updated such that a vector traveling from the eye of the user, through mark 204 ends at cube 206. In the example above, where the user moves 100 ft. to the west, if the user maintained a steady orientation during the movement, mark 204 would be adjusted to the right on see-through display 104. Thus, mark 204 would move with the background as if mark 204 were at the location of cube 206.

Processor 106 calculates the position of mark 204 within see-through display 104 based on the angle from the center of the field of view of user to the relative position of cube 206 and the known relationship between the user and see-through display 104. The movements of the perspective of user are determined by the measurements of IMU 112 and GPS 114. Additionally, system 100 accounts for changes in orientation of the user by adjusting the location of mark 204 based on changes in the orientation of the user. The orientation of the user is determined by IMU 112 and is used to adjust the location of mark 204 within see-through display 104. For example, if mark 204 is located in the center of see-through display 104 and the user rotates to the right, mark 204 is moved to the left on see-through display 104.

In another embodiment where the real world location of cube 206 is known with reference to a global reference system, the location of mark 204 within see-through display 104 is determined based on the updated global reference system position of the perspective of user. For example, as the user moves, the latitudinal and longitudinal coordinates of the user are updated by GPS 114. Processor 106 determines the angle to cube 206 based on the coordinates of the user and the coordinates of cube 206. In order to calculate the angle, processor 106 also receives the current orientation from IMU 112 and GPS 114. Formulas and methods to calculate angle between two coordinate points from an orientation are known to those skilled in the art. As mentioned above, once the relationship between use 200 and cube 206 is known, processor 106 calculates the position of mark 204 within see-through display 104. The position of mark 204 is based on the angle from the eye of the user through see-through display 104 to cube 206. Additionally, system 100 accounts for changes in orientation of user 112 by adjusting the location of mark 204 based on changes in the orientation of the user as discussed above.

Figure 7:
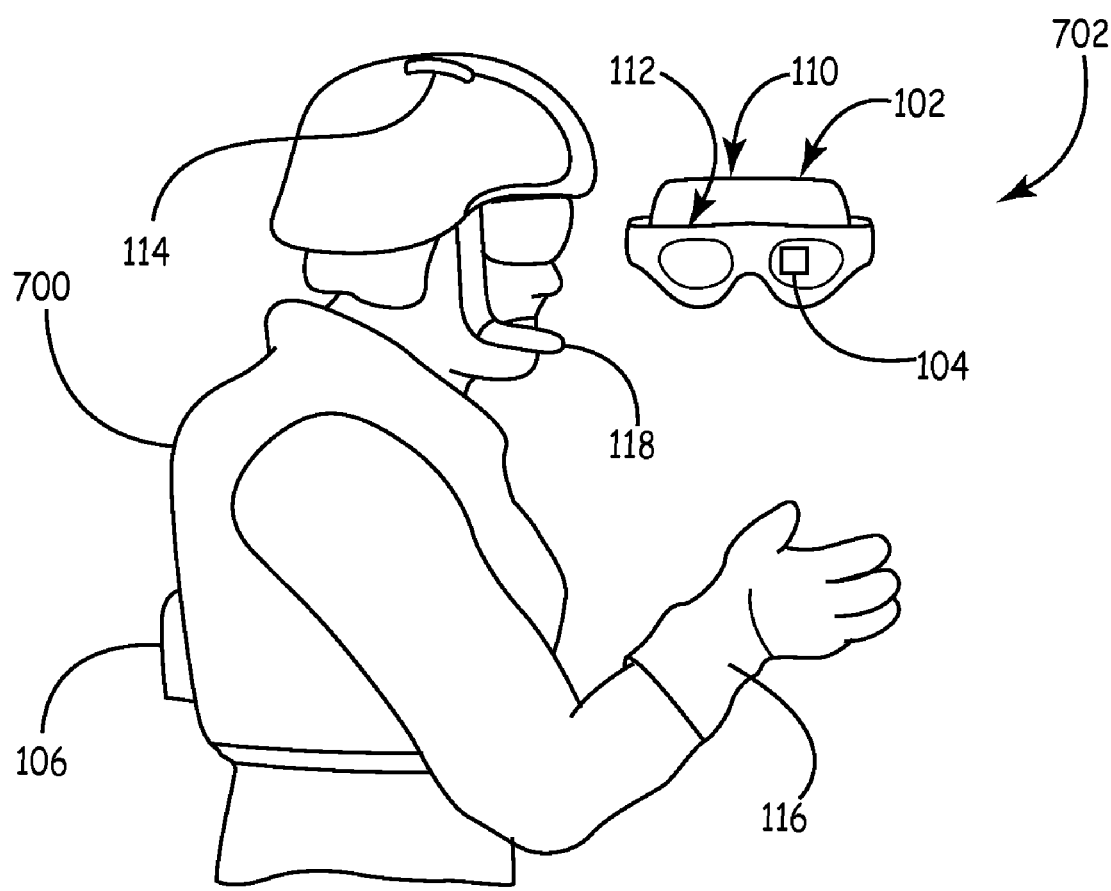
FIG. 7 is a perspective view of one embodiment of system 100 mounted on a user.

FIG. 7 illustrates one embodiment of system 100, where a user 700 has a see-through display 104 mounted on a pair of goggles 702. In this embodiment, see-through display 104 is incorporated into the lens of goggles 702. One example of a suitable see-through display is the Lumus Professional TD-18 see-through display manufactured by Lumus Ltd. User 700 observes a real world scene through see-through display 104, and see-through display 104 augments the real world scene by overlaying graphics or other markings. The real world scene and the markings from see-through display 104 are combined in the eye of user 700. As shown in FIG. 4, IMU 112, imaging device 102, and ranging device 110 are also mounted in goggles 702.

Advantageously, mounting IMU 112, imaging device 102, ranging device 110, and see-through display on goggles 702 maintains the orientation relationship between IMU, imaging device 102, ranging device 110, and see-through display 104. Alternatively, IMU 112, imaging device 102, ranging device 110, and see-through display 104 may be mounted in other locations in order to achieve similar results, such as on a helmet of the user similar to GPS 114. Processor 106 and storage device 108 are mounted on the back of user 700. A microphone 110 and a sensor 112 are also included on user 700 and will be described in more detail below.

Instructions for carrying out the various process tasks, calculations, and generation of signals and other data used in the operation of the methods described above can be implemented in a program product including software, firmware, or other processor readable instructions. These instructions are typically stored on any appropriate processor readable medium used for storage of processor readable instructions or data structures. Such processor readable media can be any available media that can be accessed by a general purpose or special purpose computer or processor, or any programmable logic device.

Suitable processor readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of processor executable instructions or data structures. Any of the foregoing may be supplemented by, or incorporated in, specially-designed Application Specific Integrated Circuits (ASICs) or Field Programmable Gate Arrays (FPGAs). When information is transferred or provided over a network or another communications connection (either hardwired, wireless, or a combination of hardwired and wireless) to a processor, the processor properly views the connection as a processor readable medium. Thus, any such connection is properly termed a processor readable medium. Combinations of the above are also included within the scope of processor readable media.

The methods described herein can be implemented in processor readable instructions, such as program modules or applications, which are executed by a data processor. Generally, program modules or applications include routines, programs, objects, data components, data structures, algorithms, and the like, which perform particular tasks or implement particular abstract data types. These represent examples of program code for executing steps of the methods disclosed herein. The particular sequence of such executable instructions or associated data structures represent examples of corresponding acts for implementing the functions described in such steps.

Although specific embodiments have been illustrated and described herein, it will be appreciated by those of ordinary skill in the art that any arrangement, which is calculated to achieve the same purpose, may be substituted for the specific embodiments shown. It is manifestly intended that any inventions be limited only by the claims and the equivalents thereof.

What is claimed is:

1. A method for marking a position of a real world object on a see-through display comprising:
    capturing an image of a real world object with an imaging device;
    identifying a pointing device within the field of view of the imaging device;
    determining a viewing angle along a line from a see-through display to a tip of the pointing device to the real world object based on an azimuth angle and an elevation angle between locations of the real world object and the pointing device within the field of view of the imaging device;
    steering a ranging device toward the real world object based on the determined viewing angle;
    determining a real world distance between the ranging device and the real world object with the ranging device, wherein the ranging device determines the real world distance based on an amount of time it takes a signal to travel from the ranging device to the real world object and back to the ranging device;
    determining an orientation of the see-through display;
    calculating a real world position of the real world object based on the viewing angle to the real world object, the real world distance between the ranging device and the real world object, and the orientation of the see-through display;
    determining a first location on the see-through display that corresponds to the calculated real world position of the real world object;
    displaying a mark on the see-through display at the first location that corresponds to the calculated real world position of the real world object;
    tracking movement of the see-through display relative to the calculated real world position of the real world object using an inertial sensor; and
    adjusting the first location of the mark as displayed on the see-through display to account for the movement of the see-through display relative to the calculated real world position of the real world object.

2. The method of claim 1, further comprising:
    correlating a location of the pointing device relative to the field of view of the imaging device to a second location on the see-through display; and
    placing a mark on the see-through display at the correlated second location on the see-through display.

3. The method of claim 2, further comprising:
    updating the correlation of the pointing device relative to the field of view of the imaging device; and
    updating the second location on the see-through display in which the mark is placed.

4. The method of claim 2, further comprising:
    updating at least one of the orientations or a position of the see-through display;
    updating the viewing angle of the see-through display;
    determining a second updated location on the see-through display based on the updated viewing angle; and
    changing the second location of the mark on the see-through display.

5. The method of claim 1, wherein the see-through display is located within the field of view of a user such that determining a viewing angle determines an angle from an eye of the user to the first location in the see-through display.

6. The method of claim 1, wherein determining a real world position determines a position in terms of an earth coordinate system.

7. A system for marking a position of a real world object on a see-through display comprising:
    a processor;
    a see-through display communicatively coupled to the processor;
    an imaging device communicatively coupled to the processor; and
    a ranging device communicatively coupled to the processor;

wherein the imaging device is configured to:
  capture an image of a real world object;
wherein the processor is configured to:
  identify a pointing device within the field of view of the imaging device;
  determine a viewing angle along a line from a see-through display to a tip of the pointing device to the real world object based on an azimuth angle and an elevation angle between locations of the real world object and the pointing device within the field of view of the imaging device;
  steer the ranging device toward the real world object based on the determined viewing angle;
  determine a real world distance between the ranging device and the real world object with the ranging device, wherein the ranging device determines the real world distance based on an amount of time it takes a signal to travel from the ranging device to the real world object and back to the ranging device;
  calculate a real world position of the real world object based on the viewing angle to the real world object, the real world distance between the ranging device and the real world object, and an orientation of the see-through display;
  determine a first location on the see-through display that corresponds to the calculated real world position of the real world object;
  display a mark on the see-through display at the first location that corresponds to the calculated real world position of the real world object;
  track movement of the see-through display relative to the calculated real world position of the real world object using an inertial sensor; and
  adjusting the first location of the mark as displayed on the see-through display to account for the movement of the see-through display relative to the real world position of the real world object.

8. The system of claim 7, wherein the processor is further configured to:
  correlate a location of the pointing device relative to the field of view of the imaging device to a second location on the see-through display; and
  place a mark on the see-through display at the correlated second location on the see-through display.

9. The system of claim 8, wherein the processor is further configured to:
  update the correlation of the pointing device relative to the field of view of the imaging device; and
  update the second location on the see-through display in which the mark is placed.

10. The system of claim 8, wherein the processor is further configured to:
  update at least one of the orientations or a position of the see-through display;
  update the viewing angle of the see-through display;
  determine an updated second location on the see-through display based on the updated viewing angle; and
  change the second location of the mark on the see-through display.

11. The system of claim 7, wherein the see-through display is located within a field of view of a user such that determining a viewing angle determines an angle from an eye of the user to the first location in the see-through display.

12. The system of claim 7, wherein the processor is configured to determine a relative position in term of an earth coordinate system.

13. A program product comprising a non-transitory processor readable medium on which program instructions are embodied, wherein the program instructions are operable to:
  capture an image of a real world object with the imaging device;
  identify a pointing device within the field of view of the imaging device;
  determine a viewing angle along a line from the see-through display to a tip of the pointing device to the real world object based on an azimuth angle and an elevation angle between locations of the real world object and the pointing device within the field of view of the imaging device;
  steer a ranging device toward the real world object based on the determined viewing angle;
  determine a real world distance between the ranging device and the real world object with the ranging device, wherein the ranging device determines the real world distance based on an amount of time it takes a signal to travel from the ranging device to the real world object and back to the ranging device;
  determining an orientation of the see-through display;
  calculate a real world position of the real world object based on the viewing angle to the real world object, the real world distance between the ranging device and the real world object and the orientation of the see-through display;
  determine a first location on the see-through display that corresponds to the calculated real world position of the real world object;
  display a mark on the see-through display at the first location that corresponds to the calculated real world position of the real world object;
  track movement of the see-through display relative to the calculated real world position of the real world object using an inertial sensor; and
  adjust the first location of the mark as displayed on the sec-through display to account for the movement of the see-through display relative to the real world position of the real world object.

14. The program product of claim 13, wherein the program instructions are further operable to:
  correlate a location of the pointing device relative to the field of view of the imaging device to a second location on the see-through display; and
  place a mark on the see-through display at the correlated second location on the see-through display.

15. The program product of claim 14, wherein the program instructions are further operable to:
  update the correlation of the location of the pointing device relative to the field of view of the imaging device; and
  update the second location on the see-through display in which the mark is placed.

16. The program product of claim 14, wherein the processor is further configured to:
  update at least one of the orientations or a position of the see-through display;
  update the viewing angle of the see-through display;
  determine an updated second location on the see-through display based on the updated viewing angle; and
  change the second location of the mark on the see-through display.

17. The program product of claim 13, wherein the program instructions are further operable to:
  calculate the real world position of the real world object in terms of an earth coordinate system.

18. A method of determining a distance to a point comprising:
- identifying a point within a field of view of an imaging device, the point corresponding to a real world object within the field of view of the imaging device;
- determining an orientation between the imaging device and the point within the field of view of the imaging device based on a position of the point within the field of view of the imaging device, wherein determining the orientation includes determining an azimuth angle for the point based on the position of the point within the field of view of the imaging device and determining the elevation angle for the point based on the position of the point within the field of view of the imaging device;
- steering a laser ranging device such that a laser beam from the laser ranging device propagates at the determined orientation towards the real world object, wherein steering the laser ranging device includes orienting the laser ranging device based on the azimuth angle and the elevation angle;
- determining a distance from the laser ranging device to the real world object located at the determined orientation based on an amount of time it takes the laser beam to travel from the laser ranging device to the real world object and back to the laser ranging device;
- calculating a real world position of the real world object based on the determined distance from the laser ranging device to the real world object and the determined orientation;
- determining a first location on a see-through display that corresponds to the calculated real world position of the real world object;
- displaying a mark on the see-through display at the first location that corresponds to the calculated real world position of the real world object;
- tracking movement of the see-through display relative to the calculated real world position of the real world object using an inertial sensor; and
- adjusting the first location of the mark as displayed on the see-through display to account for the movement of the see-through display relative to the calculated real world position of the real world object.

19. An apparatus comprising:
- a processing unit;
- a see-through display communicatively coupled to the processing unit;
- a laser ranging device coupled to the processing unit, wherein the laser ranging device is steerable, such that a laser beam from the laser ranging device is capable of being directed towards a particular orientation; and
- an imaging device coupled to the processing unit;
- wherein the processing unit is configured to:
- identify a point within a field of view of an imaging device, the point corresponding to a real world object within the field of view of the imaging device;
- determine an orientation between the imaging device and the point within the field of view of the imaging device based on a position of the point within the field of view of the imaging device, wherein the processing unit is configured to determine an orientation by being configured to determine an azimuth angle for the point based on the position of the point within the field of view of the imaging device, determine the elevation angle of the point based on the position of the point within the field of view of the imaging device;
- provide the determined orientation to the laser ranging device by being configured to provide the azimuth angle and the elevation angle to the laser ranging device, wherein the laser ranging device is configured to be steered such that a laser beam from the laser ranging device propagates at the determined orientation towards the real world object;
- determine a distance from the laser ranging device to an object located at the determined orientation based on an amount of time it takes the laser beam to travel from the laser ranging device to the object and back to the laser ranging device;
- calculate a real world position of the real world object based on the determined distance from the laser ranging device to the real world object and the determined orientation;
- determine a first location on the see-through display that corresponds to the calculated real world position of the real world object;
- display a mark on the see-through display at the first location that corresponds to the calculated real world position of the real world object;
- track movement of the see-through display relative to the calculated real world position of the real world object using an inertial sensor; and
- adjusting the first location of the mark as displayed on the see-through display to account for the movement of the see-through display relative to the real world position of the real world object.

20. The method of claim 1, wherein the ranging device is a laser ranging device; and wherein the signal is a laser beam.

21. The system of claim 7, wherein the ranging device is a laser ranging device; and wherein the signal is a laser beam.

22. The program product of claim 13, wherein the ranging device is a laser ranging device; and wherein the signal is a laser beam.

23. The method of claim 1, further comprising: communicating the real world position of the real world object to a remote device.

24. The system of claim 7, wherein the processor is further configured to: cause the system to communicate the real world position of the real world object to a remote device.

25. The program product of claim 13 wherein the program instructions are further operable to: cause the system to communicate the real world position of the real world object to a remote device.

26. The method of claim 18, further comprising: communicating the real world position of the real world object to a remote device; and identifying the real world position of the real world object to a user at the remote device.

27. The apparatus of claim 19, wherein the processing unit is further configured to: cause the apparatus to communicate the real world position of the real world object to a remote device so that the real world position of the real world object can be identified to a user of the remote device.

* * * * *